United States Patent [19]

Hamilton, II

[11] 3,805,096

[45] Apr. 16, 1974

[54] CODED TOUCH MULTIFUNCTION TOUCH CONTROL SWITCH CIRCUITRY

[76] Inventor: William F. Hamilton, II, 1528 C. Miramar Beach, Santa Barbara, Calif. 93108

[22] Filed: Jan. 22, 1973

[21] Appl. No.: 325,131

[52] U.S. Cl. ............. 307/308, 307/252 B, 307/311, 315/292, 328/119

[51] Int. Cl. ........................................... H03k 5/153

[58] Field of Search ...... 334/15; 307/311, 308, 247; 315/292, 293, 314, 316; 328/119

[56] References Cited

UNITED STATES PATENTS 3,528,044 9/1970 Manicki ................................ 334/15

3,715,623 2/1973 Szabo ............................. 315/292 X

*Primary Examiner*—John Zazworsky

*Attorney, Agent, or Firm*—Finnegan, Henderson, Farabow & Garrett

[57] ABSTRACT

The present invention provides a touch control switch circuit capable of responding to coded touch inputs, i.e., touch inputs of different duration or particular sequences of touch inputs, to selectively control the operation of a load device. The touch control switch circuit is particularly useful for operating a household lighting fixture. The touch control switch circuit allows an operator to selectively control the intensity or timing of operation of the lighting fixture by applying predetermined touch code inputs to the circuit.

26 Claims, 14 Drawing Figures

CODED TOUCH MULTIFUNCTION TOUCH CONTROL SWITCH CIRCUITRY

The present invention relates to a touch control switch circuit and, more particularly, to a coded touch, multifunction touch control switch for selectively controlling the function of a load device.

A touch control switch employs electronic circuitry to control the flow of electrical power to a load in response to the touch of a finger on a control terminal. One type of touch control switch utilizes an internal oscillator circuit basically sensitive to the capacity of the human body which is connected to the circuit by the control terminal. Another type, which depends on the usual AC power wiring, is responsive to the "hum pickup" of the body and is described in applicant's copending U.S. application Ser. No. 265,311, filed June 22, 1972, entitled "Detector Circuit with Automatic Sensitivity Control and Post Detection Filtering for Touch Control Circuitry." The circuit of the present invention is applicable with either type of touch control switch. In addition, it can be used in other applications which require the capability of distinguishing coded touch inputs to select desired output functions.

With proper design, the control terminal or touch point may be located at a distance from the switch circuitry. A single inconspicuous, easily installed conductor is all that is required to connect the touch point and the switch. The conductor is required to convey only minute currents and can be decoupled, for practical purposes, from the circuit in which power is controlled.

In many applications, touch control switches promise improved performance and reduced cost in comparison with conventional switches. Touch control switches are silent, sparkless, and may be designed for very long operating life. Although the switches may be more costly to manufacture than conventional switches, the additional cost may be more than compensated by reduced installation cost. Touch control switches may be installed at the load itself, so expensive runs of power conduit or cable to more convenient switch activation points are unnecessary and a single thin wire suffices to connect one or more switch activation points to the touch control switch. In the near future, touch control switches may replace conventional switches in such household applications as the control of overhead lighting fixtures.

With the advent of touch control switching, added functions not generally provided in conventional installations will become desirable, e.g., control of the amount of timing of power applied to the load. Potentially, at least, such added functions can be incorporated in electronic switching circuitry with little increase in size or cost.

Selection of the desired switch function poses a problem when switch circuitry is located in an inaccessible place, e.g., an overhead light, and can be signaled only by touching a remote touch point. The solution of this problem is the purpose of the present invention.

The present invention provides a touch control switch circuit responsive to a touch input applied to a receptor for controlling a load device coupled to the circuit. In accordance with the invention, the circuit includes means for detecting a coded touch input applied to the receptor and producing output signals corresponding to different coded touch inputs, a memory circuit responsive to the output signals for selectively recording the output signals and producing control signals of different characteristics determined by subsequent coded touch inputs and the recorded output signals, and control means responsive to the control signals produced by the memory circuit for selectively operating the load device in different functions determined by the control signals. In a preferred embodiment, the detecting means comprises a detector coupled to the receptor for producing a touch code signal in response to a coded touch input applied to the receptor and a decoder for distinguishing different touch code signals produced by the detector and producing output signals corresponding to the different touch code signals.

The preferred embodiment of the invention includes a sensing circuit responsive to changes in an ambient condition for suppressing the operation of the memory circuit in response to predetermined output signals produced by the decoder in the event of a sensed change in the ambient condition to operate the load device independently of predetermined coded touch inputs. The sensing circuit includes an auxiliary sensor, e.g., a photosensitive element, to permit the operation of a lighting fixture in response to coded touch inputs to be determined by ambient lighting conditions.

In the following detailed description, the invention is described in connection with preferred embodiments, such as timed-on and delayed-off touch control circuits to apply power to a lighting fixture for a preset period, a two level touch control circuit to provide selective operation of a lighting fixture at two different predetermined power levels, a multilevel touch control circuit to permit selective operation of a lighting fixture at a plurality of different levels, and a night light touch control circuit to provide regular evening illumination of a lighting fixture for a predetermined period. In each of the embodiments, the memory of the touch control switch circuit records the present state of the switch, i.e., on, off, and power level, and provides function control of the load in response to the state of the switch and subsequent coded touch inputs. In some of the embodiments, the memory also records switch programs selected by the coded touch inputs and executes transitions between on and off in response to inputs from timing circuits or auxiliary sensors.

The touch control switch circuits of the preferred embodiments are programmable, i.e., present coded touch inputs are capable of selecting future responses of the circuits. For example, the timed-on and delayed-off touch control circuits, in response to particular coded touch inputs, select transitions from on to off at some future time by operation of timers incorporated in the control circuits. The multi-level touch control circuit records the power level for operation of the load in response to future touch inputs which turn the load on. As a result of particular coded touch inputs, the night light touch control circuit is capable of selecting off-to-on and on-to-off transitions in response to a change in ambient conditions detected by an auxiliary sensor.

The accompanying drawings illustrate preferred embodiments of the invention, and, together with the description, serve to explain the principles of the invention.

Figure 1:
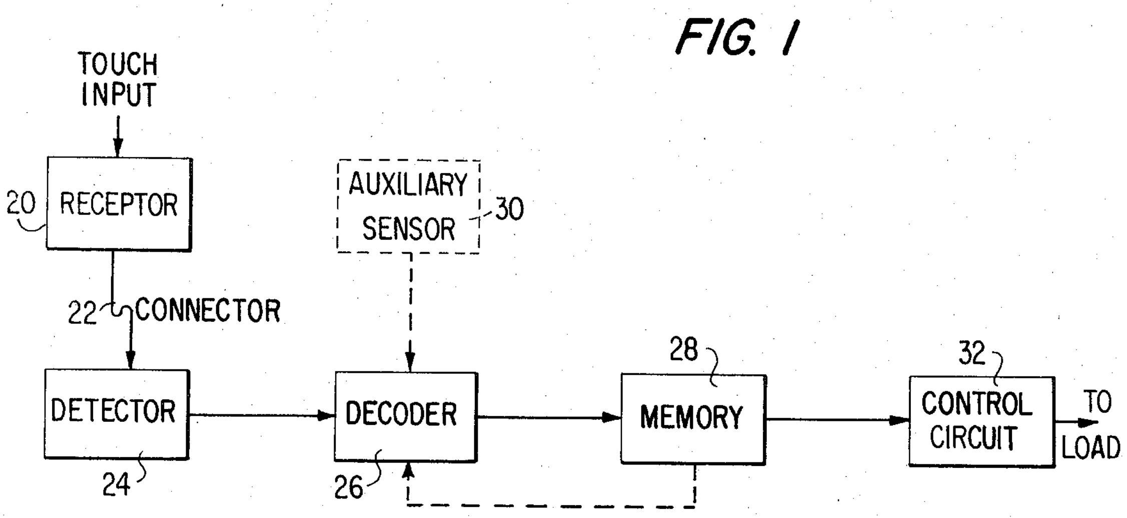
FIG. 1 is a block diagram of a basic coded touch multifunction switch circuit constructed in accordance with the principles of the present invention.

The basic coded touch, multifunction switch (CTMS) is shown in FIG. 1. It is a novel combination of elements providing for the convenient transmission, reception, and execution of touch commands which, in combination with other inputs, determine the timing and amount of power switched into a load.

The touch control switch of FIG. 1 is responsive to a touch input applied to a touch receptor 20. The touch receptor is preferably a conductive electrode conveniently located for the reception of touch commands. A connector 22, which can be a single conductor for minute currents, conveys touch commands from receptor 20 to a touch control switch circuit comprising the remaining elements of FIG. 1.

In accordance with the invention, the touch control switch circuit includes means for detecting a coded touch input applied to the receptor and producing output signals corresponding to different coded touch inputs, and a memory circuit responsive to the output signals for selectively recording the output signals and producing control signals of different characteristics determined by subsequent coded touch inputs and the recorded output signals. In the preferred embodiment, the detecting means comprises a detector coupled to the receptor for producing a touch code signal in response to a coded touch input applied to the receptor, and a decoder for distinguishing different touch code signals produced by the detector and producing output signals corresponding to the different touch code signals.

Figure 2:
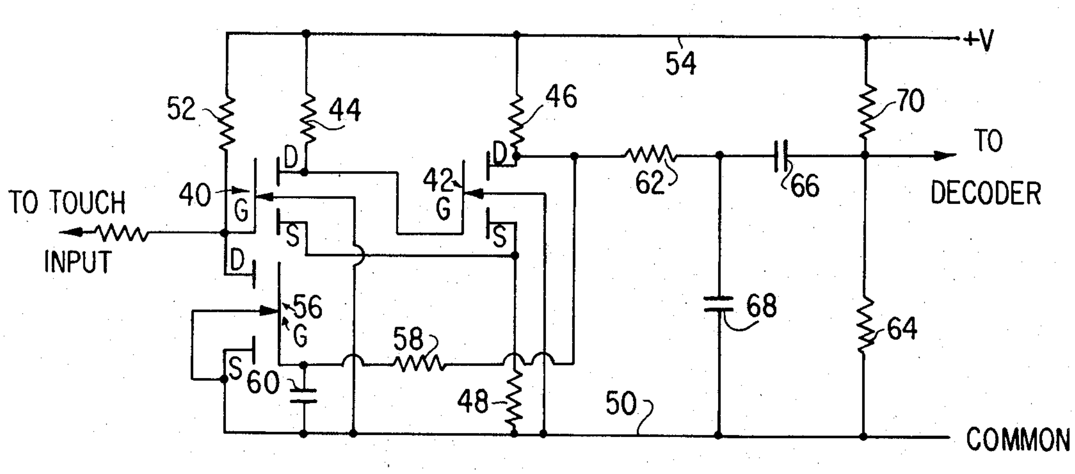
FIG. 2 is a schematic diagram of a detector circuit which can be used in the touch control switch circuit of FIG. 1.

As shown in FIG. 1, a detector 24 is coupled to receptor 20 via conductor 22. The detector produces an unambiguous output during touch commands but rejects transient electrical noise and persistent changes in ambient electrical conditions. A preferred embodiment of the detector is illustrated in FIG. 2 and is described below in detail. The same detector is disclosed in applicant's co-pending U.S. application Ser. No. 265,311, mentioned above.

A decoder 26 receives the touch code signals produced by detector 24. The decoder distinguishes among predetermined touch code signals and generates appropriate commands for changes in the state of a memory circuit 28. Decoder 26 may also respond to inputs from other sensors, e.g., an auxiliary sensor 30, and its response to touch commands may be dependent on the state of the memory circuit and any other sensors. Memory circuit 28 records the current switch state (off or on), the amount of power to be supplied to the load when on, whether external sensors are active, and the times, if any, at which or until which power is to be initiated or terminated and executes these changes of state when required without need of further input from the decoder.

Figure 3:
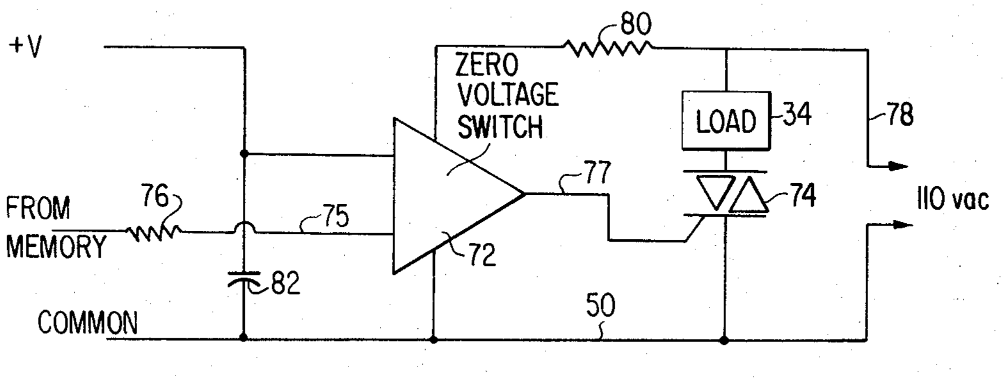
FIG. 3 is a diagram of an on-off control circuit which can be used in the touch control switch circuit of FIG. 1.

The touch control switch also includes control means responsive to the control signals produced by the memory circuit for selectively operating a load device in different functions determined by the control signals. As embodied in FIG. 1, a control circuit 32 is coupled to the output of memory circuit 28. A preferred embodiment of the control circuit is shown in FIG. 3 for operating a load device 34. The control circuit delivers power to the load device in accordance with the state of the memory circuit. A detailed description of the control circuit appears below.

Touch commands for the coded touch, multifunction switch may require either single or multiple touch inputs to receptor 20. A single touch command is coded by its duration, longer touches selecting different decoder and memory states than shorter touches. Multiple touch commands comprising a brief sequence of separate touches may be coded by the number, duration, and spacing of touches constituting the sequence.

Auxiliary sensors, not responsive to touch inputs, may respond to such conditions as ambient illumination or temperature. They may either cause immediate changes in the state of the memory or alter response of the decoder to touch commands.

The coded touch, multifunction switch of FIG. 1 may be arranged to perform a variety of switching functions. In the following examples, a number of specific embodiments appropriate for practical applications are described. Each, for simplicity, uses the detector and control circuits of FIGS. 2 and 3, respectively, except as otherwise noted.

Referring to FIG. 2, the detector comprises a Schmitt trigger including a pair of field effect transistors 40 and 42. Appropriate biasing resistors 44 and 46 are connected to drain electrodes D of field effect transistors 40 and 42, respectively. A common resistor 48 connects source electrode S of the field effect transistors to a common or ground conductor 50. The threshold of the Schmitt trigger is controlled by a variable voltage divider comprising a resistor 52 connected between a power supply conductor 54 and gate electrode G of transistor 40 and a field effect transistor 56 having its drain electrode D connected to gate electrode G of transistor 40 and its source electrode S connected to common conductor 50.

A feedback path including a low pass filter responsive to the output of the Schmitt trigger circuit is provided to control the operation of field effect transistor 56. The low pass filter comprises a resistor 58 and a capacitor 60 connected in series between drain electrode D of transistor 42 and common or ground conductor 50. The junction of resistor 58 and capacitor 60 is coupled to gate electrode G of transistor 56.

The output of the Schmitt trigger circuit is applied to an RC bandpass filter comprising a pair of resistors 62 and 64 (typically 1 megohm and 22 megohms, respectively) and a pair of capacitors 66 and 68 (typically 0.2 mfd and 0.1 mfd, respectively). A resistor 70 (e.g., 44 megohms) connects the junction between resistor 64 and capacitor 66 to power supply conductor 54.

In the operation of the detector circuit of FIG. 2, in the absence of a touch input to the receptor, hum pickup will switch the trigger circuit on, but only for a small fraction of each cycle of the input signal, i.e., during the peak of its positive excursion. Upon the occurrence of a touch input, the input signal amplitude will abruptly increase and the positive excursion will exceed the trigger threshold for a longer time (up to one-half cycle) so that the output pulses produced by the trigger circuit will be longer in duration. As a result, the average output voltage will increase toward a level of one-half of the supply voltage. Once the higher output voltage propagates through the low pass filter in the feedback path, the DC bias on the trigger will decrease, the AC input threshold will increase, and the duty cycle of the trigger otuput will decrease until equilibrium is re-established. The output of the trigger circuit is passed through the band pass filter to allow only inputs of a predetermined duration, e.g., a few tenths of a second, to pass with minimum attenuation.

Referring to FIG. 3, the control circuit includes a zero-voltage switch 72, e.g., a standard RCA CA 3079 integrated circuit, designed for driving a triac 74 directly. The zero-voltage switch includes an input 75 coupled to the output of memory circuit 28 (FIG. 1) through a resistor 76 and an output 77 coupled to a control terminal of triac 74, e.g., an RCA 40761. Triac 74 is connected in series with load 34 between common or ground conductor 50 and a power conductor 78 connected to a 110 volt AC line. In operation, a control signal from memory circuit 28 causes zero-voltage switch 72 to gate triac 74 into conduction to allow load 34 to be operated by the voltage applied between ground conductor 50 and power conductor 78. The zero-voltage switch utilizes a built-in 6 volt DC power supply operated from the 110 volt AC line through a series resistor 80. Sufficient output from the supply is available across an external filter capacitor 82 to power the touch control switch circuits via line +V.

TIMED-ON CODED TOUCH MULTIFUNCTION SWITCH

Figure 4:
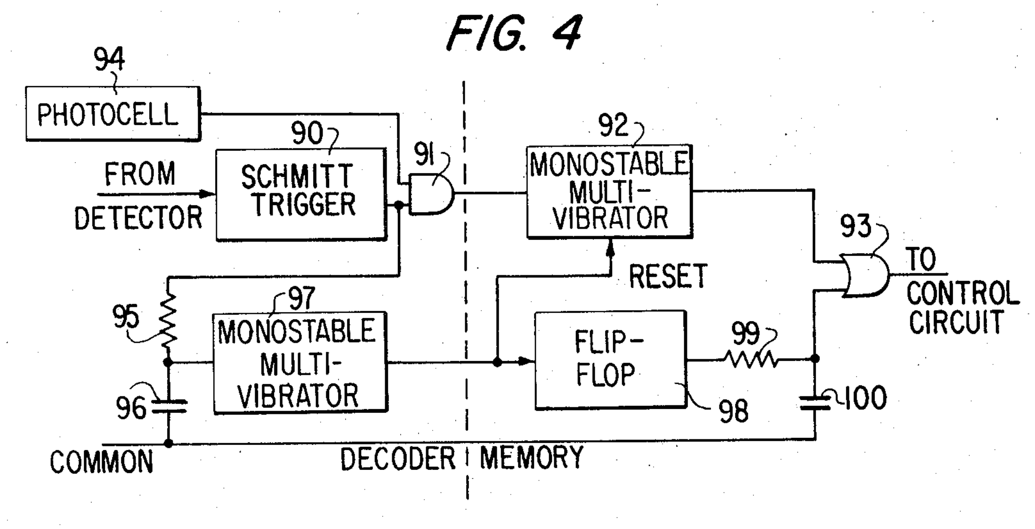
FIG. 4 is a block diagram of preferred embodiments of decoder and memory circuits which can be used in the circuit of FIG. 1 to provide a timed-on touch control switch.

The coded touch multifunction switch shown in FIG. 4 is desirable for controlling lighting of an infrequently used area, e.g., corridors or stairwells, where electric power is to be conserved. A short touch command turns the switch on for a preset period, after which it reverts to off. An auxiliary sensor is provided to inhibit the operation of the circuit if the area is already illuminated. Override is made possible by long touch commands. A first long touch input sets the switch in an "on" state which persists until a second long touch command is received.

In the block diagram of FIG. 4, the output from the touch detector is coupled to a Schmitt trigger circuit 90 which is turned on so long as its input exceeds a certain level, as during a touch command. The output of trigger circuit 90 is transmitted through an AND gate 92 to a monostable multivibrator 92 which, in turn, applies its output through an OR gate 93 to the control circuit to pass power to the load until the monostable multivibrator reverts to its stable state. A photocell 94, which is located in the area of illumination, provides a high output in darkness to enable gate 91 to pass signals from trigger circuit 90 to monostable multivibrator 92 and provides a low output to block gate 91 and suppress triggering of the monostable multivibrator when the area is illuminated.

The output of trigger circuit 90 is also passed through a first RC low-pass filter comprising a resistor 95 and capacitor 96 to another monostable multivibrator 97 which is thus triggered only by touch commands exceeding a minimum duration. Once triggered, multivibrator 97 switches a flip-flop 98 which will apply a control signal to OR gate 93 until the flip-flop is again switched by another long touch input. At the same time, monostable multivibrator 97 resets monostable multivibrator 92 to its quiescent state.

The output of flip-flop 98 is passed through a second RC low-pass filter comprising a resistor 99 and a capacitor 100 to OR gate 93 to delay slightly the operation of the control circuit. Because of the delay, the control circuit is momentarily turned off after a long touch input sets flip-flop 98 and resets monostable multivibrator 92. This delay causes the controlled lights to blink, acknowledging receipt of a long touch command. Without this indication, the operator would not know definitely whether his touch command had been long enough to switch the lights on for an indefinite rather than a temporary period.

Figure 5:
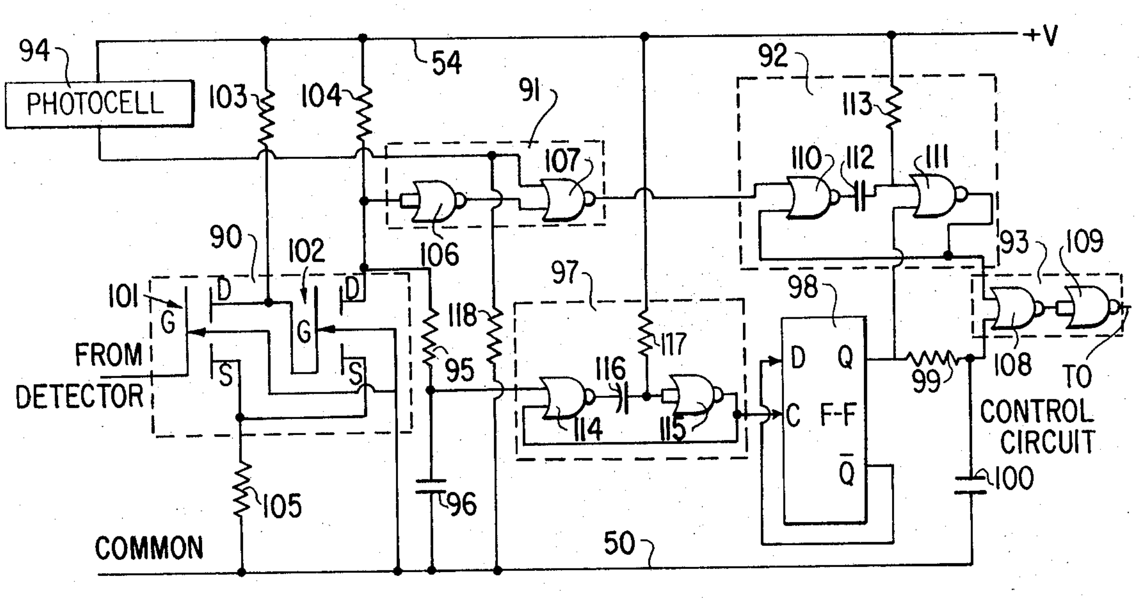
FIG. 5 is a schematic diagram illustrating the decoder and memory circuits of FIG. 4 in detail.

Referring to the detailed circuit diagram of FIG. 5, Schmitt trigger 90 comprises a pair of field effect transistors 101 and 102 having drain electrodes D coupled to power supply conductor 54 through a pair of biasing resistors 103 and 104, respectively. Drain electrode D of transistor 102 is also coupled to AND gate 91 and to the first low pass filter, i.e., resistor 95 and capacitor 96. Source electrodes S of transistors 101 and 102 are coupled to common conductor 50 by a resistor 105, gate electrode G of transistor 101 is coupled to the output of the detector, and gate electrode G of transistor 102 is coupled directly to the common conductor.

The logical AND and OR functions of gates 91 and 93, respectively, are realized in the circuit by combining NOR gates. Thus, AND gate 91 comprises a pair of NOR gates 106 and 107 (a third NOR gate to invert the photocell output is obviated by connection of the photocell to provide a low output in darkness), and OR gate 93 comprises a pair of NOR gates 108 and 109. Monostable multivibrator 92 comprises a conventional circuit including a pair of NOR gates 110 and 111, a coupling capacitor 112, and a bias resistor 113 connected to power supply conductor 54. Similarly, monostable multivibrator 97 is a conventional circuit comprising a pair of NOR gates 114 and 115, a coupling capacitor 116, and a resistor 117 coupled to the power supply conductor. Photocell 94 is conductive when illuminated, e.g., a Raytheon CK 1201. The photocell is connected from power supply conductor 54 to common conductor 50 through a load resistor 118. The photocell provides a high output when illuminated to prevent transmission of short touch commands to monostable multivibrator 92.

DELAYED-OFF CODED TOUCH MULTIFUNCTION SWITCH

Figure 6:
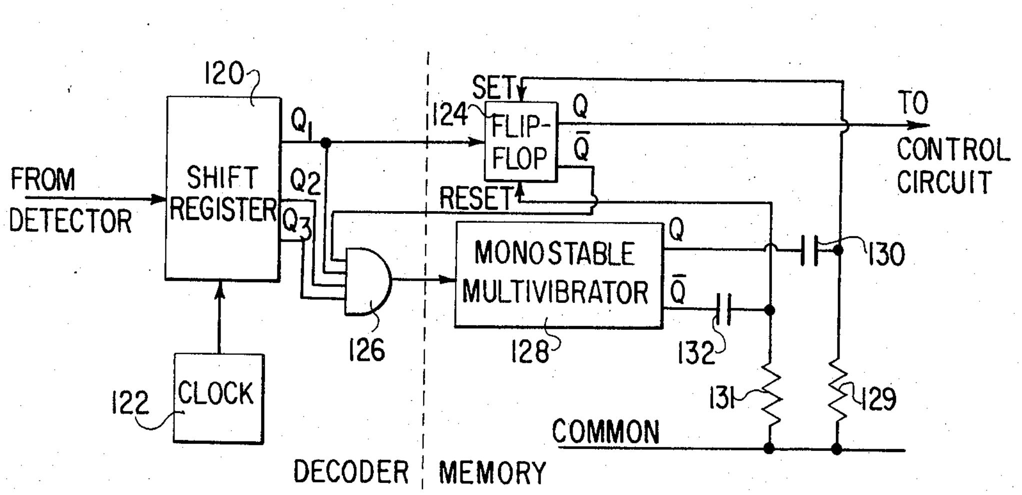
FIG. 6 is a block diagram of preferred embodiments of decoder and memory circuits which can be used in the circuit of FIG. 1 to provide a delayed-off touch control switch.

The coded touch multifunction switch of FIG. 6 is useful for controlling illumination at a porch or garage. A single short touch input turns the switch on, and a subsequent short touch input turns it off. If the switch is off, a long touch input has the same effect as a short touch input, i.e., it turns the switch on. If the switch is on, a long touch will turn the switch off and then immediately on for a predetermined interval. The resulting blink in the controlled lights acknowledges the initiation of the timing cycle to the switch operator. Thus, for example, the delayed-off switch permits a walkway or garage to be temporarily illuminated during departure.

In the block diagram of FIG. 6, the output from the touch detector is applied to the input of a shift register 120 having a plurality of sequentially operable outputs $Q_1$, $Q_2$ and $Q_3$. A clock 122 is provided for driving the shift register to sample the detector output at intervals of a fraction of a second and to transfer it first to ouput $Q_1$, and subsequently to outputs $Q_2$ and $Q_3$. Consequently, a short touch input will cause output $Q_1$ to go high for one clock period and then low during the next clock period while output $Q_2$ is high and so on. A long touch, on the other hand, will cause outputs $Q_1$, $Q_2$ and $Q_3$ to go high consecutively and to be high simultaneously. Output $Q_1$ is applied to the input of a flip-flop 124 so that any touch input causes the flip-flop to change state. Output Q of flip-flop 124 operates the control circuit to supply power to the load when output Q is high. Thus, a series of short touch inputs will turn the touch control switch alternately on and off.

Outputs $Q_1$, $Q_2$ and $Q_3$ of shift register 120 are applied to inputs of an AND gate 126. Output $\overline{Q}$ of flip-flop 124 is applied to an additional input of AND gate 126. The AND gate produces a high output when all of its inputs are high. AND gate 126 triggers a monostable multivibrator 128 to produce a high signal at its output Q for a predetermined interval. Output Q of monostable multivibrator 128 is applied to the set terminal of flip-flop 124 through an RC high pass filter comprising a resistor 129 and a capacitor 130 to drive the flip-flop on in the event of a low to high transition at output Q of the monostable multivibrator. In addition, output $\overline{Q}$ of monostable multivibrator 128 is applied to the reset terminal of flip-flop 124 through an RC high pass filter comprising a resistor 131 and capacitor 132 to drive the flip-flop off in the event of a low to high transition at output $\overline{Q}$ of the monostable multivibrator.

If the switch is on, i.e., flip-flop 124 produces a high signal at output Q, and a long touch input to the receptor results in actuation of monostable multivibrator 128 to operate the controlled lights on for a preset period. As a result of the long touch input, flip-flop 124 is driven off by the high signal at output $Q_1$ of shift register 120 to change its output $\overline{Q}$ from low to high. When outputs $Q_2$ and $Q_3$ of the shift register become high, AND gate 126 produces a high output which actuates monostable multivibrator 128. Output Q of monostable multivibrator 128 changes from low to high and the low to high transition is applied to the set terminal of flip-flop 124 to again turn the flip-flop on. After a predetermined period, monostable multivibrator 128 reverts to its initial state and its output $\overline{Q}$ changes from low to high. This low to high transition is applied to the reset terminal of flip-flop 124 to turn the flip-flop off. As a result of the above operation of flip-flop 124, the control circuit initially interrupts the flow of power to the load for a brief period. The interruption causes a lamp load to blink, providing acknowledgement to the switch operator that his touch input has been sufficient in duration to initiate the timing cycle of the switch. Thereafter, the control circuit will cause the lamp load to turn off automatically after a predetermined interval.

Figure 7:
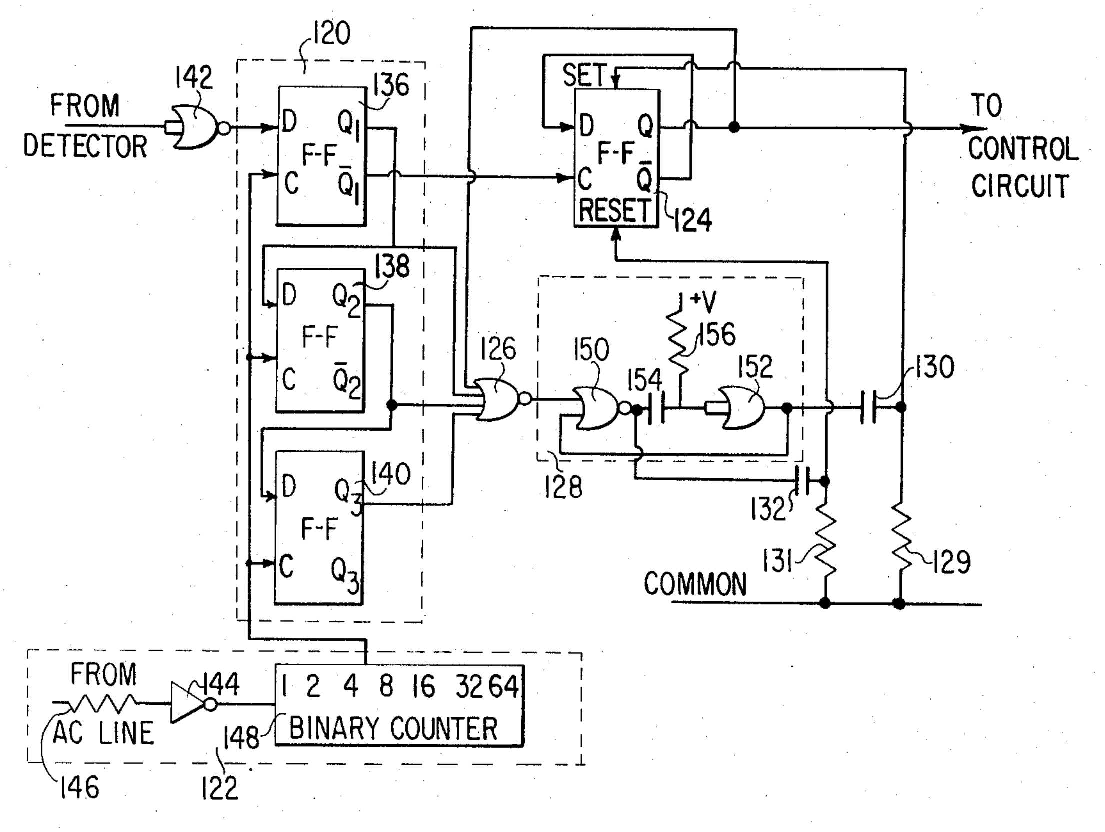
FIG. 7 is a schematic diagram illustrating the decoder and memory circuits of FIG. 6 in detail.

The circuit of FIG. 7 is equivalent to the block diagram of FIG. 6 but differs in minor details. To achieve the function of AND gate 126 (FIG. 6), the circuit of FIG. 7 employs a NOR gate designated by the same reference numeral. Output Q of flip-flop 124 is applied to one input of NOR gate 126.

Shift register 120 is fabricated from three data flip-flops 136, 138 and 140. An inverter 142 shapes detector output pulses for input to flip-flop 136 of the shift register, and changes the touch code from high to low. The inverter output is applied to data input D of flip-flop 136 in the shift register. In the absence of touch input, the Q outputs of the register flip-flops are thus high.

A 60-hertz squarewave signal is derived by connecting an inverter 144 to the AC power line through a high resistor 146. Diodes built into the inverter to protect it from excessive inputs limit the input excursion to the range from zero to six volts (the inverter supply voltage). Thus, the inverter output is low whenever the power line voltage exceeds 3 volts, and is high otherwise. This squarewave drives a binary counter 148 from which a squarewave at 1/8 of the power line frequency is taken to clock the shift register. At each positive transition of this squarewave, each flip-flop in the register transfers the binary signal, low or high, at its D input to its Q output, and holds it there until the next positive transition of the clock output.

Memory flip-flop 124 is toggled by output $\overline{Q}_1$ of register flip-flop 136. Output $\overline{Q}_1$ switches from low to high at touch initiation because the touch detector output is passed through inverter 142. Output Q of memory flip-flop 124 is applied to the control circuit. If output Q of flip-flop 124 is high, the control circuit maintains the lamp on and, if output Q of the flip-flop is low, the lamp is turned off.

Outputs $Q_1$, $Q_2$ and $Q_3$ of register flip-flops 136, 138 and 140 and output Q of memory flip-flop 124 are combined by NOR gate 126, which provides a high output only when all of its inputs are low. Thus NOR gate 126 will provide a high output only when a touch input has persisted through at least three positive transitions of the clock input to the shift register and flip-flop 124 is off. Monostable multivibrator 128, which is a conventional circuit comprising a pair of NOR gates 150 and 152, a coupling capacitor 154, and a bias resistor 156, is triggered by the high output of NOR gate 126 and remains on for a preset time interval. The triggering of the monostable multivibrator results in a low to high transition at the output of NOR gate 152 to set flip-flop 124 on. After the present interval, the monostable multivibrator reverts to its original state and NOR gate 150 produces a low to high transition to reset flip-flop 124 off.

TWO-LEVEL CODED TOUCH MULTIFUNCTION SWITCH

Figure 8:
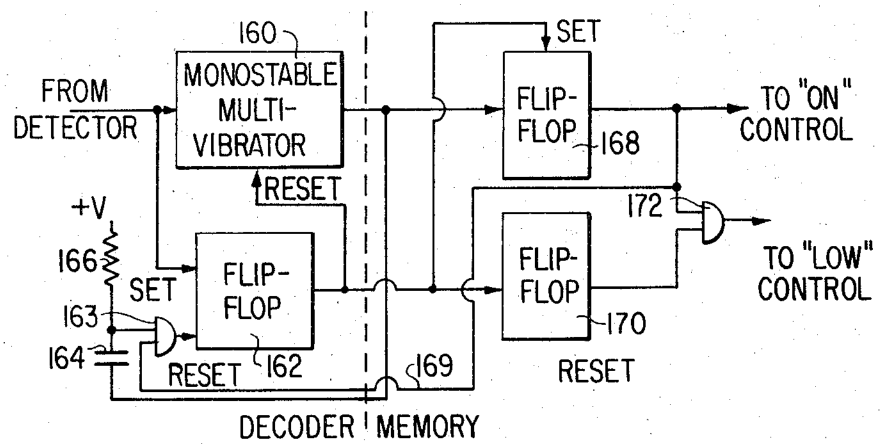
FIG. 8 is a block diagram of preferred embodiments of decoder and memory circuits which can be used in the circuit of FIG. 1 to provide a two level touch control switch.

The coded touch, multifunction switch shown in FIG. 8 is intended for providing either a high or low level of illumination from a single filament incandescent lamp. A single touch operates the switch from off to on, or on to off if it is initially on. If the switch is off, two short touch inputs in quick succession will turn it to on and reprogram it to low if it is initially high, or to high if it is initially low.

In the block diagram of FIG. 8, the ouptut from the touch detector is applied to a monostable multivibrator 160 and the set terminal of a setreset flip-flop 162. The reset terminal of the flip-flop is coupled to the output of an OR gate 163. The OR gate includes a first input coupled to the output of multivibrator 160 via a capacitor 164. This first input of NOR gate 163 is normally held at supply voltage +V through a resistor 166 thereby holding flip-flop 162 off. A second input of OR gate 163 is coupled to the output of a first memory flip-flop 168 via a conductor 169.

A touch input initially triggers only monostable multivibrator 160, which produces a pulse of a few tenths of a second duration. When this pulse ends, the output of the monostable multivibrator abruptly drops to zero, pulling down the first input of the OR gate to zero through a coupling capacitor 164. The capacitor then charges through resistor 166 which takes a few tenths of a second to charge to the supply voltage. During the charging of the capacitor, the output of the OR gate will be low if the switch is off, i.e., if the output of first memory flip-flop 168 is low. During this condition, flip-flop 162 can be set by an input from the touch detector. In this case flip-flop 162 will produce an output pulse until its reset input goes high again.

In the two level touch control switch described above, the band-pass filter of the touch detector (FIG. 2) is altered to provide only a brief output for a touch input regardless of whether the touch input is brief or protracted. Specifically, filter capacitors 66 and 68 are both reduced to 0.5 mfd., and the output resistors 64 and 70 are reduced from 22 and 44 megohms to 10 and 22 megohms, respectively. With this modified filter, the touch code signal produced by the detector in response to a touch input of any duration will not persist long enough to set flip-flop 162 at the conclusion of the output pulse produced by multivibrator 160. Only if a second touch input is initiated near the conclusion of the multivibrator output pulse will the flip-flop be set.

Alternatively, the switch may be operated with the touch detector exactly as shown in FIG. 2. In this case, a single long touch input, rather than two successive short touch inputs, will place the switch in the low condition, and a short touch, rather than a single touch of any duration, will be required to operate the switch from off to on, or from on to off.

As shown in FIG. 8, the output of monostable multivibrator 160 is applied to the input of first memory flip-flop 168 which changes state each time a touch input triggers the multivibrator. If flip-flop 168 is switched on by a first touch input and a succeeding touch input then triggers set-reset flip-flop 162, a second memory flip-flop 170 changes state and first memory flip-flop 168 is held on. First memory flip-flop 168 thus changes state at each touch command, indicating to the control circuit whether the switch is on or off. Second memory flip-flop 170 changes state only at two successive touch inputs which set flip-flop 168 on, indicating whether a high or low level of load operation is required. To meet the requirements of a particular control circuit (described below) the outputs of the first and second memory flip-flops are combined by an AND gate 172, so that a high output to the "low" input of the control circuit will appear only when the switch is on.

Figure 9:
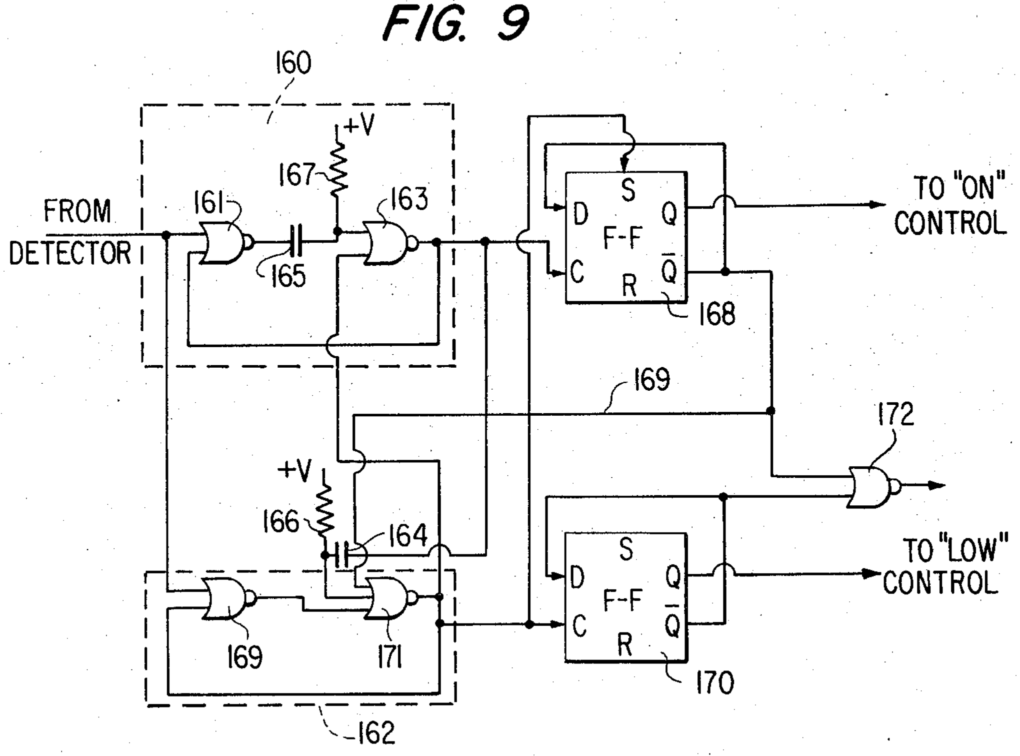
FIG. 9 is a schematic diagram illustrating the decoder and memory circuits of FIG. 8 in detail.

FIG. 9 shows a detailed circuit corresponding to the block diagram of FIG. 8. As shown in FIG. 9, monostable multivibrator 160 comprises a conventional circuit including a pair of NOR gates 161 and 163, a coupling capacitor 165, and a bias resistor 167. Flip-flop 162 comprises a pair of NOR gates 169 and 171. NOR gate 171 is provided with three input terminals so that OR gate 163 of FIG. 8 can be eliminated. Memory flip-flops 168 and 170 comprise data flip-flops having clock input terminals C coupled to the outputs of monostable multivibrator 160 and flip-flop 162, respectively. The data input D of each flip-flop is coupled to its output $\overline{Q}$. The operation of the circuit of FIG. 9 is identical to the operation of the circuit of FIG. 8 discussed above.

Figure 10:
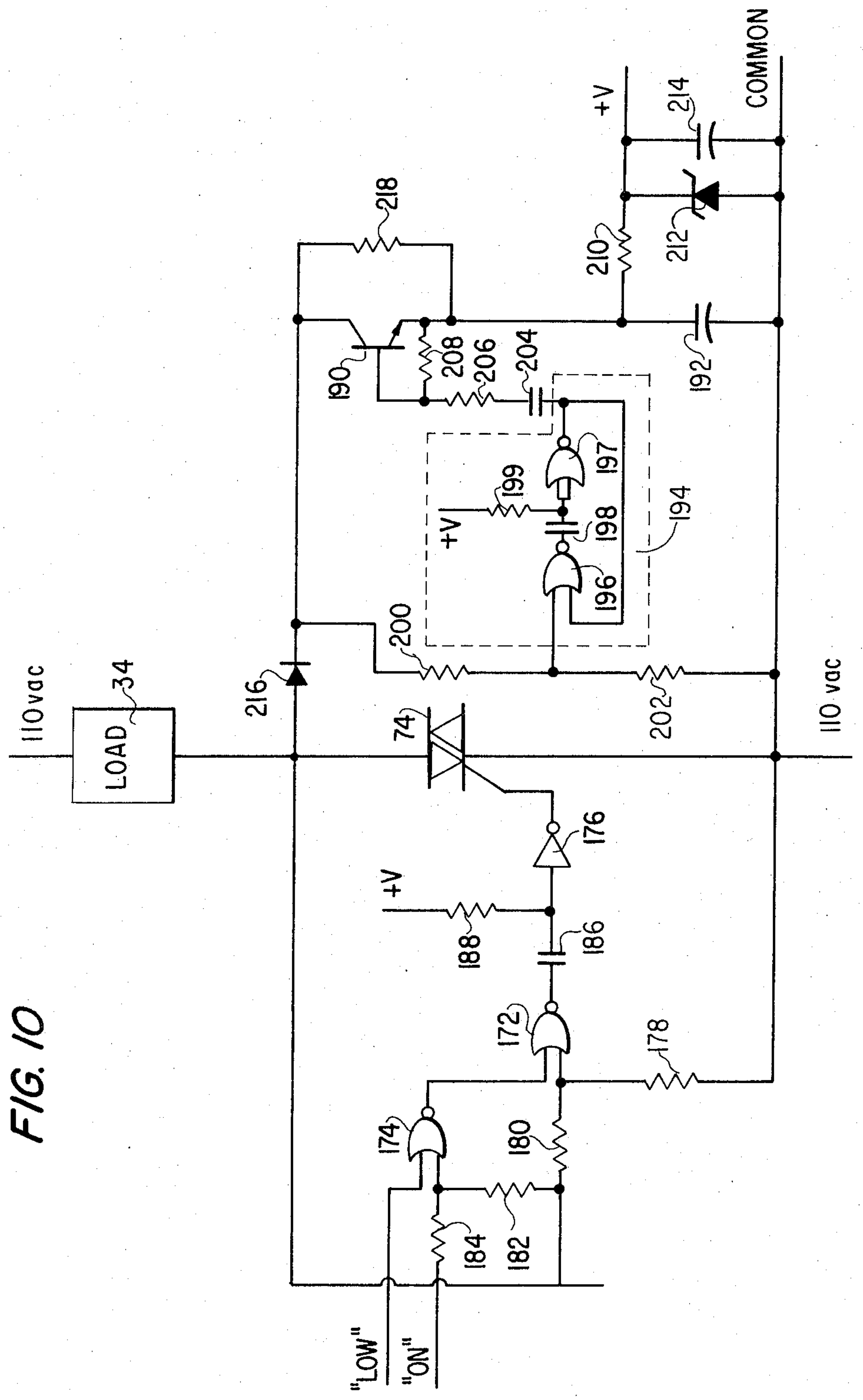
FIG. 10 is a schematic diagram illustrating a two level control circuit which can be used with the decoder and memory circuits of FIGS. 8 and 9.

In the two level coded touch, multifunction switch, a two input control circuit with capabilities additional to those of the control circuit of FIG. 3, is required to produce appropriate power flows to the load. FIG. 10 illustrates a two level control circuit for use with the touch control circuit of FIGS. 8 and 9. As shown in FIG. 10, the control circuit provides a two wire coded touch multifunction switch for operating triac 74 to control the level of operation of load device 34 from a 110 volt AC power line. This circuit allows replacement of existing switches in numerous installations where only one side of the power line is accessible.

The control function is performed in the circuit of FIG. 10 by input circuitry to the left of triac 74 which switches power through the load. The input circuitry consists of a timing circuit including NOR gates 172 and 174, which produces pulses at the zero crossing of the line voltage, and a drive circuit including an inverter 176 responsive to the timing circuit output, which produces brief gate pulses for the triac at the conclusion of the zerocrossing pulses.

Zero-crossing pulses are produced by both NOR gates 172 and 174. One input of gate 172 is connected through a voltage divider comprising resistors 178 and 180 to the 110 volt AC line, and, whenever the line voltage exceeds a predetermined level, e.g., +30 volts, the input voltage to gate 172 is above its threshold and the gate output is low, regardless of the signal applied to its other input. Similarly, one input of gate 174 is connected to the 110 volt AC line through a voltage divider comprising resistors 182 and 184. When the control circuit is to be on, the reference voltage for the divider is the supply voltage, and the output of gate 174 will be low whenever the line voltage exceeds another predetermined level, e.g., −24 volts.

If the "low" input of NOR gate 174 is below the gate threshold, the inputs to NOR gate 172 will be both low only while the line voltage is between −24 and +30 volts. NOR gate 172 will produce high output pulses approximately centered on the zero crossings of the line voltage.

The output of NOR gate 172 is coupled to inverter 176 through coupling capacitor 186. Ordinarily, current from the power supply through a resistor 188 holds the inverter input high, maintaining the inverter output low. When the output of NOR gate 172 goes high, a protective diode (not shown) built into the inverter input prevents the input voltage from rising above the supply voltage, thereby discharging the coupling capacitor. During an output pulse from NOR gate 172, the charge on coupling capacitor 186 is reduced nearly to zero. When the output of NOR gate 172 abruptly returns to low, the input to inverter 176 drops to low and the inverter output goes high, where it remains until the coupling capacitor recharges through resistor 188 to the inverter threshold voltage.

Accordingly, the control circuit triggers triac 74 with a brief pulse early in each line half-cycle, so long as its "on" input is high and its "low" input is low. If the "low" input is high, the output of NOR gate 174 remains low continuously and, thus, the output of NOR gate 172 will drop from high to low only as the line voltage rises through +30 volts and the triac will be triggered only on alternate half-cycles. In this condition, only half the average line voltage will be applied to the load relative to that when the "low" input of the controller is low, and a controlled lamp will operate at low brightness rather than high. If both the "low" and "on" inputs of NOR gate 174 are low, then the output of NOR gate 174 will be low only when the line voltage exceeds +30 volts. At this time, however, the input to NOR gate 172 from the first voltage divider will be above the gate threshold. Thus, both inputs to NOR gate 172 will not simultaneously be low, and no output pulses will be provided to inverter 176 and triac 74 so that no power will be switched through load 34.

Because the control circuit permits the voltage across triac 74 to rise to a substantial level before the riac can be switched on, power is available from a two-wire connection for powering the switch circuitry. The power supply to the right of the triac in FIG. 10 takes advantage of this available power to supply 6 volts DC at a current of up to about 0.1 ma, the approximate requirement of the detector, decoder, memory, and control circuit combined. This power supply includes a transistor switch 190 to channel current into a storage capacitor 192 during the period when the line voltage is rising from approximately 12 volts to approximately 25 volts.

In FIG. 10, a monostable multivibrator 194 comprising a pair of NOR gates 196 and 197, a coupling capacitor 198, and a bias resistor 199, is triggered on whenever the line voltage rises through a predetermined level, e.g., +12 volts. A voltage divider comprising resistors 200 and 202 couples the input of monostable multivibrator 194 to the power supply line. The output of the multivibrator is coupled to the base of transistor 190 through an RC coupling network comprising a coupling capacitor 204 and resistor 206. The coupling network also includes an additional resistor 208 to allow capacitor 204 to charge to the emitter potential of the transistor between pulse outputs from the multivibrator. Consequently, output pulses from multivibrator 194 raises the transistor base potential sufficiently to turn the transistor on. Resistor 206 between coupling capacitor 204 and the base of transistor 190 limits base current to a desired value. The transistor remains on for the duration of the multivibrator output pulse, i.e., a few hundred microseconds.

While transistor 190 is on, current flows from the power line through the load and into storage capacitor 192, as well as through a resistor 210 and zener diode 212. While the transistor is off, current is maintained through the resistor and zener diode by the stored charge on the storage capacitor 192. A capacitor 214 across zener diode 212 minimizes effects of transient loads on the output voltage across the zener diode.

A rectifier diode 216 prevents reverse biasing of transistor 190 during negative line half-cycles. A resistor 218 in parallel with the transistor passes sufficient current, when the control circuit holds triac 74 off, to develop the full supply output voltage. Once the transistor is in operation, resistor 218 is unnecessary in the circuitry, but without it the transistor will not turn on, and no supply voltage will be developed, after the line, load, and switch are initially connected.

If two-wire operation is not required, the power supply may be simplified. Monostable multivibrator 194, transistor 190, the RC coupling network (resistors 206 and 208 and capacitor 204), and the voltage divider (resistors 200 and 202) may all be omitted, and the control circuit and power supply connections to the line moved to the opposite side of load 34. Preferably, the resistor 218 (1 megohm) will also be replaced by a resistor of one-half or one-third that value, to ensure adequate power output from the supply. At the same time, the voltage dividers in the input circuitry would preferably be changed to cause gate switching closer to line zero crossings, and triac switching at nearly zero line voltage.

MULTILEVEL CODED TOUCH MULTIFUNCTION SWITCH

Figure 11:
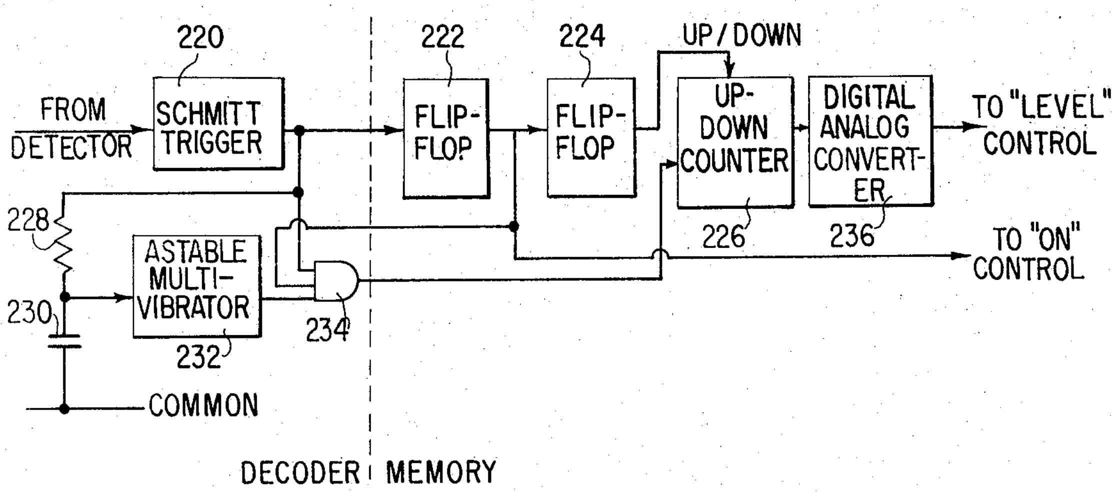
FIG. 11 is a block diagram of preferred embodiments of decoder and memory circuits which can be used in the circuit of FIG. 1 to provide a multi-level touch control switch.

FIG. 11 shows a coded touch multifunction switch circuit capable of 16 different output levels when used in conjunction with a suitable control circuit. It is suitable for providing a wide range of illumination from an incandescent light. If the touch control switch is off, a short touch input will turn it on without changing its most recent level of operation of the load. A continuing touch input will, however, cause the level of operation to progressively increase or decrease. If the switch is on, either a short or a long touch input will turn it off without changing the level of a load operation.

In FIG. 11, the output from the touch detector is applied to a Schmitt trigger 220. The trigger output is coupled to the input of a first flip-flop 222 connected in series with a second flip-flop 224. First flip-flop 222 provides on-off memory. The flip-flop switches on or off in response to touch code signals from trigger circuit 220 as a result of touch inputs to the receptor. Second flip-flop 224 provides up-down memory. Each transition of first flip-flop 222 switches flip-flop 224 from one of its states to the other. The output of flip-flop 224 is subsequently applied to an up-down control terminal of an up-down counter 226 to set the counter for increasing or decreasing counting operations in alternate "on" states of the touch control switch. The Schmitt trigger provides an output pulse in response to a touch input with a very rapid rise time, to toggle the flip-flops.

The output of Schmitt trigger 220 is also passed through an RC low-pass filter comprising a resistor 228 and capacitor 230 to an astable multivibrator 232. If a touch input is of sufficient duration, astable multivibrator 232 is enabled to generate a series of clock pulses which is passed through an AND gate 234 to increase or decrease the count held by the up-down counter. AND gate 234 is provided with inputs responsive to the outputs of Schmitt trigger circuit 220, flip-flop 222, and astable multivibrator 232.

Clock pulses are gated to up-down counter 226 only when the onoff memory, i.e., flip-flop 222, is on. Thus, long touch inputs which operate the touch control switch to its "off" state will not change the level of the up-down counter. Similarly, clock pulses are also gated to the counter only so long as the touch code signal applied to the Schmitt trigger persists. Thus, cessation of the touch command immediately halts changes in the level of operation of the load.

The output of up-down counter 226 is applied to a digital-to-analog converter 236 to convert the output of the counter into an analog control signal having a magnitude determined by the duration of the touch input. The output of the converter is applied to a variable level control circuit (FIG. 13) which supplies an amount of power to the load depending on the output level of the digital to analog converter. The output of the on-off memory, i.e., flip-flop 22, is also applied to the control circuit as an on-off control signal independent of the level control signal from the converter.

Figure 12:
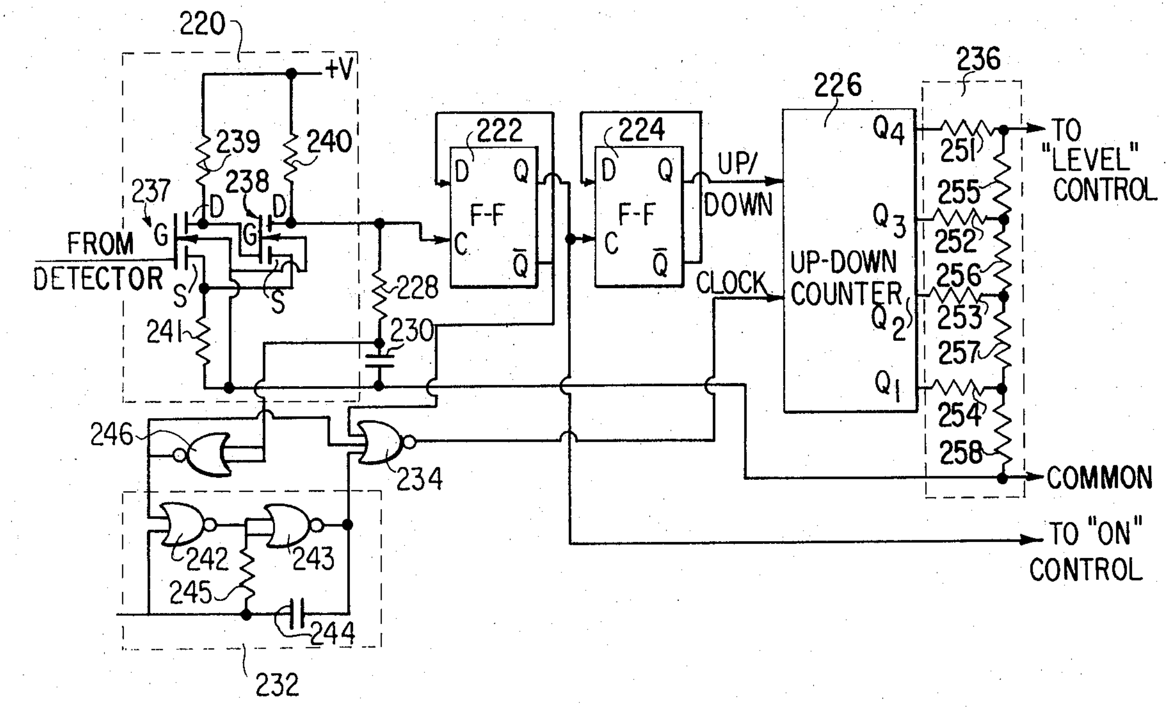
FIG. 12 is a schematic diagram illustrating the decoder and memory circuits of FIG. 11 in detail.

Circuit details of the multilevel coded touch, multifunction switch are presented in FIG. 12. Schmitt trigger 220 consists of a pair of enhancement-mode field effect transistors 237 and 238, a pair of bias resistors 239 and 240 for coupling the drain electrodes D of transistors 237 and 238. respectively, to the power supply conductor and a common resistor 241 for coupling the source electrodes S to the common or ground conductor. Each memory flip-flop 222 and 224 is a data-type unit in which a data input D is transferred to an ouptut Q at a positive clock transition. Output $\overline{Q}$ is fed back to input D of each flip-flop so that the flip-flop will toggle at successive clock inputs. Up-down counter 226 is a standard monolithic integrated circuit with appropriate pin connections to the common and supply lines (not shown) and a plurality of outputs $Q_1$, $Q_2$, $Q_3$ and $Q_4$. The up-down counter functions as a four-bit binary counter which advances or declines by one unit at each positive transition of its clock input.

A stable multivibrator 232 is a conventional circuit including a pair of NOR gates 242 and 243, a coupling capacitor 244, and a bias resistor 245. The multivibrator is disabled when the input of NOR gate 242, driven by the output of Schmitt trigger 220 through the low-pass RC filter (resistor 228 and capacitor 230) and an inverter 246, is high. As a result, the clock is enabled, with a slight lag, only while a touch input of sufficient duration is applied to the receptor to actuate the trigger circuit.

In the touch control circuit of FIG. 12, the function of AND gate 234 (FIG. 11) is performed by a three input NOR gate, also identified by reference numeral 234. The clock signal is gated to up-down counter 226 through the NOR gate and is passed to the counter only when first flip-flop 222 is on, i.e., its output $\overline{Q}$ is low, and when the output of Schmitt trigger 220 is high, i.e., during a touch input.

Digital to analog converter 236 comprises a resistance network including a plurality of resistors 251–258, inclusive. Resistor 251 is coupled to output $Q_4$ of up-down counter 226 and is connected in series with resistors 255, 256, 257 and 258 to the common conductor. Resistor 252 is coupled to output terminal $Q_3$ of up-down counter 226 and is also connected in series with resistors 256, 257, and 258 to the common or ground conductor. Similarly, resistor 253 is coupled to output terminal $Q_2$ of the up-down counter and is connected in series with resistors 257 and 258 to the common or ground conductor, and resistor 254 is coupled to output terminal $Q_1$ and connected in series with resistor 258 to ground.

Figure 13:
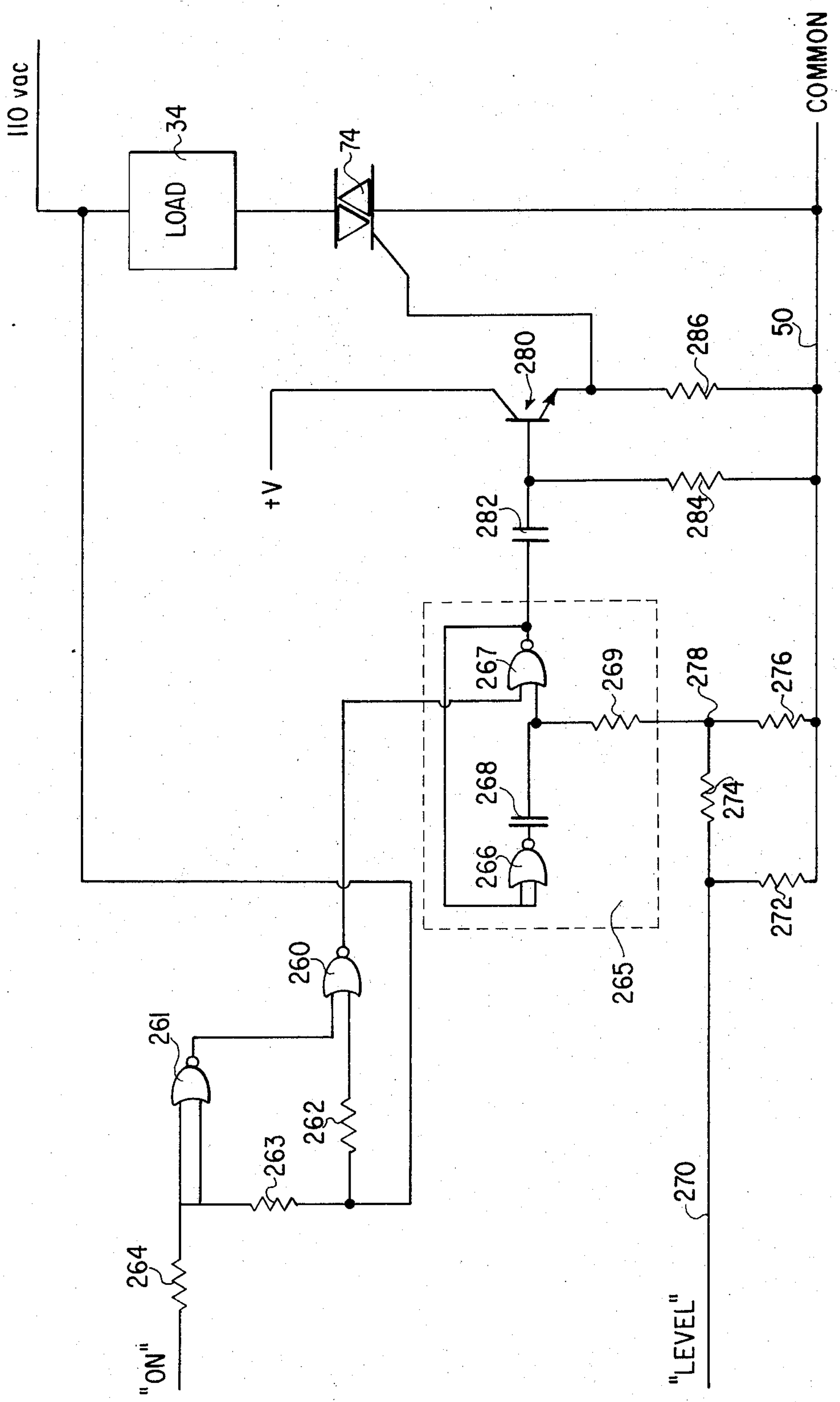
FIG. 13 is a schematic diagram of a variable level control circuit which can be used with the decoder and memory circuits of FIGS. 11 and 12.

A variable level control circuit which can be driven by the circuit of FIGS. 11 and 12 is shown in FIG. 13. In this control circuit, a first pair of NOR gates 260 and 261 is used to generate output pulses at the zero crossings of the power line voltage, as in the circuit of FIG. 10. The output of NOR gate 261 is coupled to one input of NOR gate 260 and the other input of NOR gate 260 is coupled to the power line voltage through a resistor 262. Both inputs of NOR gate 261 are coupled to the power line through a voltage divider consisting of resistors 263 and 264. The "on" control signal produced by memory flip-flop 222 (FIGS. 11 and 12) is applied to the inputs of NOR gate 261 through resistor 264.

The variable level control circuit also includes a monostable multivibrator 265 comprising a conventional circuit including a pair of NOR gates 266 and 267, a coupling capacitor 268, and a bias resistor 269. The output of NOR gate 260 is applied to NOR gate 267 of the multivibrator to provide a pulse triggered by the zero-crossing pulses having a duration dependent on a control voltage derived from the digital to analog converter.

As shown in FIG. 13, the output or "level" voltage produced by the digital to analog coverter is applied via conductor 270 to a voltage divider network consisting of resistors 272, 274 and 276. The resulting voltage appearing at a junction 278 between resistors 274 and 276 constitutes a variable control voltage for multivibrator 265. The output of multivibrator 265 is applied to the base of a transistor 280 through a coupling capacitor 282. A resistor 284 connects the base of transistor 280 to common conductor 50, and a resistor 286 connects its emitter to the common conductor. The collector of the transistor is connected to power supply +V. The termination of the variable duration pulse produced by the multivibrator drives transistor 280 briefly into conduction to supply a trigger pulse to triac 74 to switch power through load 34.

In operation of the circuit of FIG. 13, assuming the "on" line is at +V (6 volts), the inputs of NOR gate 261 exceed its threshold, e.g., 3 volts, whenever the line voltage exceeds a predetermined level, e.g., −3 volts. As a result, the NOR gate produces a "low" output which is applied to one input of NOR gate 260 whenever the line voltage exceeds −3 volts. The signal applied to the other input of NOR gate 260 is high whenever the line voltage exceeds +3 volts. Thus, NOR gate 260 produces positive pulses when the line voltage is passing between −3 and +3 volts.

The pulse output from NOR gate 260 is applied to NOR gate 267 to switch its output to low. As a result, NOR gate 266 produces a high output. The output of NOR gate 266 is coupled through capacitor 268 to one input of NOR gate 267 to hole its output low while the coupling capacitor drains through the resistor network to ground. When the voltage at the input of NOR gate 267 coupled to capacitor 268 arrives at the threshold level, the NOR gate produces a high output which results in a low output by NOR gate 266. The coupling capacitor discharges through built-in diodes (not shown) at the input of NOR gate 267, and the control circuit is prepared for a similar response to the next zero crossing pulse from NOR gate 260.

The time required for coupling capacitor 268 to charge sufficiently for the input to NOR gate 267 to drop below the threshold level depends on the control or "level" voltage applied to the resistor network on conductor 270. The resistor network loads the digital to analog converter of FIG. 12 such that the quiescent voltage at junction 278 varies between zero and almost three volts as the counter advances from zero to 15, its maximum count. When the voltage at junction 278 is low, the threshold of NOR gate 267 is reached in a small fraction of a power line cycle after the zero crossing. When the voltage at junction 278 is near 3 volts, the threshold is reached only just before the next zero crossing, i.e., almost a half-cycle later.

When the threshold of gate 267 is reached and a high signal appears at its output, the base of transistor 280 is driven positive. Since the transistor is connected in an emitter-follower configuration, current is thus passed to the gate of triac 74 to turn the triac on. The triac remains on until the next zero crossing of the power line. Thus, a higher voltage at junction 278 delays triac turn-on until late in the half-cycle and causes a small average power to be dissipated in the load, while a lower voltage cuases earlier triac turn-on and consequently more power dissipated in the load.

The RC coupling network between NOR gate 267 and transistor 280 limits the transistor on time and triac gate pulse to a brief interval, to avoid unnecessary current drain from the power supply. Resistor 286 from the triac gate to ground prevents inadvertent turn-on of the triac when the transistor is switched off.

NIGHT LIGHT CODED TOUCH MULTIFUNCTION SWITCH

Figure 14:
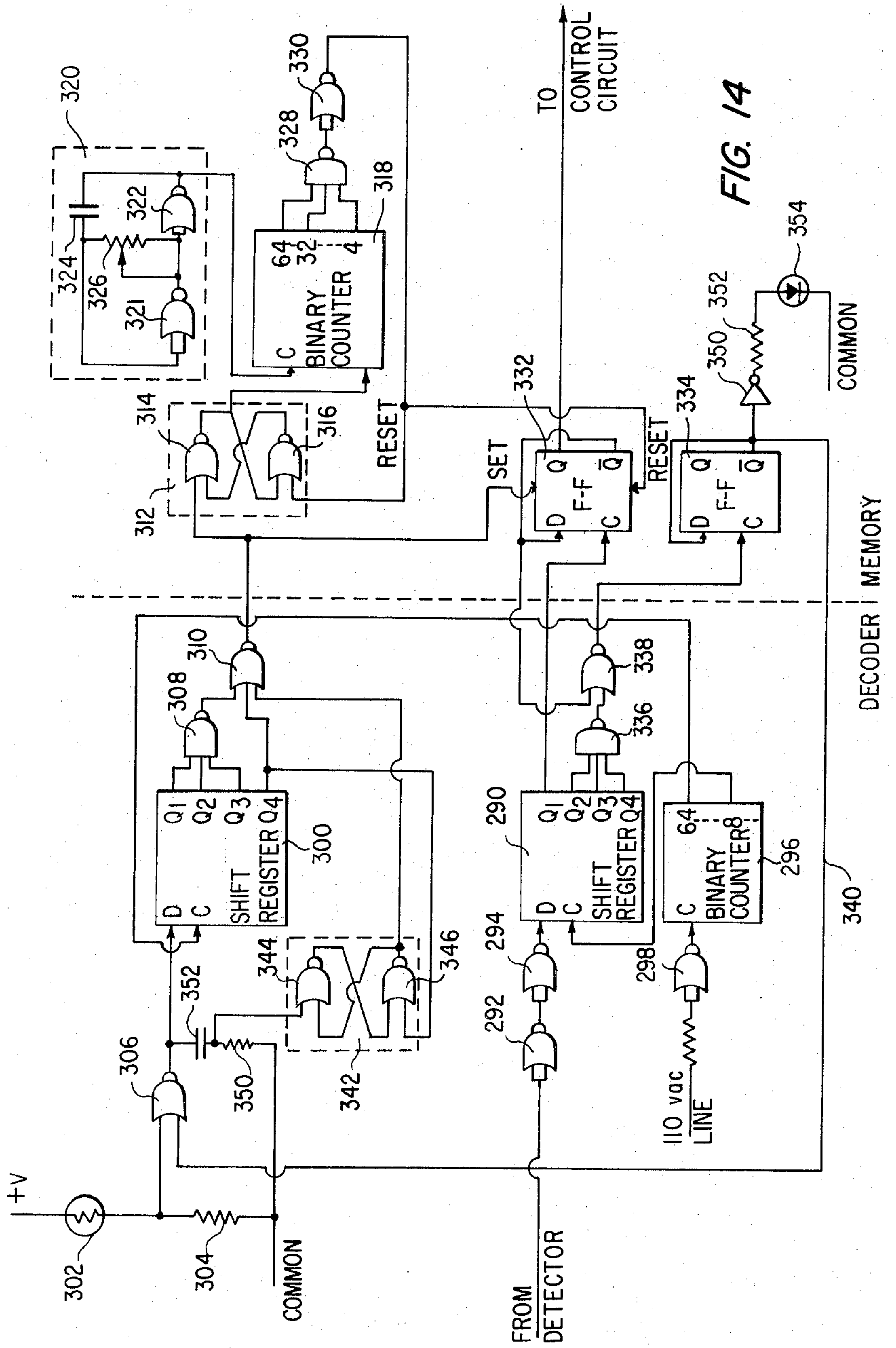
FIG. 14 is a schematic diagram of preferred embodiments of decoder and memory circuits which can be used in the circuit of FIG. 1 to provide a night light touch control switch.

The coded touch multifunction switch of FIG. 14 is intended to provide regular evening illumination of a room or other area. A photocell circuit senses dusk and issues a turn-on command. After a preset interval, which may be several hours in length, a turn-off command is issued. These commands change the state of the touch control switch from off to on, or on to off, only if the switch is not already in the state to which it is commanded. At any time, a short touch input will change the state of the switch, without interfering with the operation of the photocell timing cycle. By a long touch input, the photocell timing circuit may be inactivated or reactivated. A small pilot light indicates whether the photocell timing circuit is active.

A unique photocell circuit discriminates against artificial lighting changes, so that extinguishing all the lights in the illuminated area will not turn the switch on. This circuit permits the photocell to be built into the light fixture which it controls, and to be illuminated by the light from the fixture as well as artificial light from other lamps in the room.

The circuit of FIG. 14 includes a first shift register 290 having a data input D responsive to the detector output and a plurality of sequentially operable outputs $Q_1$, $Q_2$, $Q_3$ and $Q_4$. The output of the detector is applied through a pair of inverters 292 and 294 to input D of the shift register. A binary counter 296 driven through an inverter 298 by the 110 volt AC line is applied to a clock input of shift register 290. The circuit also includes a second shift register 300 having a data input D and a plurality of sequentially operable outputs $Q_1$, $Q_2$, $Q_3$ and $Q_4$.

In addition, the circuit includes a sensor responsive to changes in an ambient condition and a gate for coupling the sensor to the input of the second shift register. As shown in FIG. 14, a sensor comprising a photoconductive cell 302 is connected in series with a load resistor 304 and power supply +V so that in darkness a low voltage appears across the resistor. The voltage across the load resistor is applied to a first input of NOR gate 306. If the signal applied to a second input of NOR gate 306 is also low, darkness will thus result in a high output from the NOR gate. The NOR gate output is the data input for shift register 300 which receives clock pulses from counter 296 about once per second. At each clock pulse, the NOR gate output is sampled and transferred to output $Q_1$. At the same time, the previous content of output $Q_1$ is shifted to output $Q_2$ and so on to outputs $Q_3$ and $Q_4$.

When a transition from light to dark is sensed by photocell 302, outputs $Q_1$ through $Q_4$ of shift register 300 will successively switch to high. A NAND gate 308 is connected to provide a low output only when outputs $Q_1$, $Q_2$ and $Q_3$ are all high. A NOR gate 310 is connected to provide a high output only when the output of NAND gate 308 is low and output $Q_4$ is still low. Thus, NOR gate 310 produces a single pulse at the light-to-dark transition. This pulse sets a counter control flip-flop 312 comprising a pair of NOR gates 314 and 316 in the memory circuit which in turn enables a binary counter 318 by switching its reset line to low. The counter is clocked by an astable multivibrator 320 comprising a pair of NOR gates 321 and 322, a coupling capacitor 324, and a potentiometer 326, having a period controlled by the setting of the potentiometer, typically, 3 minutes. Once counter 318 is enabled, it counts from zero to 100. The counter output is detected by a three-input NAND gate 328 which produces a low output when the count arrives at 100. This output is applied to an inverter 330 which resets the counter control flip-flop to produce a high input on the counter reset line.

In the circuit of FIG. 14, the memory circuit also includes a first memory flip-flop 332 having a clock input C responsive to output $Q_1$ of first shift register 290, a set terminal responsive to a combination of outputs of second shift register 300 through NAND gate 308 and NOR gate 310, and a reset terminal responsive to the output of inverter 330. Output $\overline{Q}$ of flip-flop 332 is applied to its data input D. The timing circuit is responsive to the same combination of outputs of second shift register 300 as the set terminal of first memory flip-flop 332. In operation, the timing circuit resets first memory flip-flop 332 a predetermined time after it is set by the output of NOR gate 310.

In addition, the memory includes a second memory flip-flop 334 having a clock input C responsive to outputs $Q_2$, $Q_3$ and $Q_4$ of first shift register 290 through a NAND gate 336 and a NOR gate 338. Output $\overline{Q}$ of flip-flop 334 is applied to its data input D and via a conductor 340 to a second input of NOR gate 306. When output $\overline{Q}$ of flip-flop 334 is low, NOR gate 306 is enabled so that a low input from the junction between photoconductive cell 302 and resistor 304 will produce a high output at NOR gate 306 to actuate data input D of second shift register 300.

When counter control flip-flop 316 is initially set, a set signal is applied to first memory flip-flop 332. Since the output of flip-flop 332 is applied to the control circuit, the controlled light fixture is thus switched on. When counter control flip-flop 316 is reset, typically 300 minutes later, a reset signal is applied to first memory flip-flop 333 to turn the flip-flop and the control circuit off unless switched off by previous touch commands.

The decoder also includes a control circuit responsive to abrupt transitions in ambient lighting conditions detected by the photosensitive device for preventing operation of the timing circuit. As shown in FIG. 14, NOR gate 310 by which counter control flip-flop 316 is set has an input responsive to a control flip-flop 342 comprising a pair of NOR gates 344 and 346. The control flip-flop is used to indicate abrupt transitions from light to dark, which occur, for example, when artificial lighting is turned off. The set input of control flip-flop 342 is connected to the output of NOR gate 306 via a high pass filter comprising resistor 350 and capacitor 352. The filter produces a high output only for rapid transitions of the data input to second shift register 300 from low to high. When control flip-flop 342 is set, counter-control flip-flop 312 cannot be triggered regardless of the contents of shift register 300. Ceontrol flip-flop 342 indicating an abrupt light-dark transition is reset only when output $Q_4$ of shift register 300 produces a high signal.

The output of the detector is amplified and applied to first shift register 290 via inverters 292 and 294. Any touch initiation produces a transition from low to high at output $Q_1$ of shift register 290. A sufficiently long touch input will produce simultaneous high outputs at register outputs $Q_2$, $Q_3$ and $Q_4$. As a result, NAND gate 336 connected to these outputs produces a low output which is applied to a first input of a NOR gate 338. A second input of NOR gate 338 is coupled to output terminal $\overline{Q}$ of memory flip-flop 332. Thus, in response to the low output of NAND gate 336, NOR gate 338 produces a high output signal if memory flip-flop 332 is on, i.e., output $\overline{Q}$ is low.

Output $Q_1$ of shift register 290 toggles first memory flip-flop 332 to drive the control circuit. Thus, any touch input will change the state of the switch from off to on or from on to off. The long touch signal from NAND gates 336 and 338 toggles second memory flip-flop 334 which gates the photocell output to second shift register 300 only when the flip-flop is set. Thus, a long touch command, which turns the switch on, will also enable or disable photocell timing cycle initiation. A timing cycle already in progress, however, is not interrupted by a long touch command.

An indicator circuit including an inverter 350, a current limiting resistor 352, and a light emitting diode 354 is connected to output Q of flip-flop 334. This circuit provides a visible indication of whether flipflop 334 is set and the photocell circuit is active.

The present invention provides touch control switch circuitry which is responsive to coded touch inputs, i.e., touch inputs varying in duration or sequence, to provide multifunction operation of a load device, such as an electric lighting fixture. The coded touch, multifunction touch control switch circuitry allows an operator to selectively control the timing or intensity of operation of the load device by applying different coded touch inputs. The circuitry is particularly useful in applications where it is desirable to provide timed-on and delayed-off control of a lighting fixture, to provide selective operation of a lighting fixture at two or more levels of intensity, or to perform switching in response to associated sensors or timers. The ease of installation and the variety of function control make the touch control switch circuitry highly desirable as a substitute for conventional wiring of lighting fixtures.

The invention in its broader aspects is not limited to the specific details shown and described, and modifications may be made in the details of the touch control switch circuit without departing from the principles of the present invention.

What is claimed is:

1. A touch control switch circuit responsive to a touch input applied to a receptor for controlling a load device coupled to the circuit, comprising:

means for detecting a coded touch input applied to the receptor and producing first output signals in response to all coded touch inputs and second output signals corresponding to coded touch inputs of predetermined characteristics;

a memory circuit including a first memory element responsive to the first output signals and a second memory element responsive to the second output signals for recording the output signals and producing control signals determined by subsequent coded touch inputs applied to the receptor and the recorded output signals; and control means responsive to the control signals produced by said memory circuit for selectively operating the load device in different functions determined by the control signals.

2. The circuit of claim 1, wherein said detecting means comprises:

a detector coupled to the receptor for producing different touch code signals in response to coded touch inputs of different characteristics applied to the receptor; and a decoder for distinguishing the different touch code signals produced by said detector and producing first output signals in response to all coded touch inputs and second output signals corresponding to touch code signals of predetermined characteristics.

3. A touch control switch circuit responsive to a touch input applied to a receptor for controlling a load device coupled to the circuit, comprising:

a detector circuit coupled to the receptor for producing short and long touch code signals in response to short and long touch inputs, respectively, applied to the receptor;

a decoder for distinguishing the short and long touch code signals and producing different output signals corresponding to the short and long touch code signals;

a memory circuit including a monostable device responsive to the output signals corresponding to the short touch code signals for producing first control signals having a predetermined duration and a bistable device responsive to the output signals corresponding to the long touch signals for producing second control signals having a duration determined by the interval between successive long touch inputs; and a control circuit responsive to the first and second control signals produced by said memory circuit for operating the load device for a predetermined period corresponding to the duration of the first control signals in the event of a short touch input to the receptor and for operating the load device for an indefinite period in the event of a long touch input to the receptor, the operation of the load device terminating upon the occurrence of a subsequent long touch input.

4. The circuit of claim 3, wherein:

said decoder comprises a Schmitt trigger circuit responsive to the short and long touch code signals produced by said detector for producing output signals of short and long duration determined by the touch code signal, a first monostable multivibrator, and a low pass filter for coupling the output of said Schmitt trigger circuit to the input of said first monostable multivibrator to operate said first monostable multivibrator in response to the output signals of long duration; and said memory circuit comprises a second monostable multivibrator having an input terminal responsive to the output of said Schmitt trigger circuit and a reset terminal responsive to the output of said first monostable multivibrator, a flip-flop responsive to the output of said first monostable multivibrator, and a gate responsive to the outputs of said second monostable multivibrator and said flip-flop for applying the control signals produced by said second monostable multivibrator and said flip-flop to said control circuit.

5. The circuit of claim 4, which includes:

a low pass filter for coupling the output of said flip-flop to said gate.

6. The circuit of claim 4, wherein:

said decoder includes a gate for coupling the output of said Schmitt trigger circuit to the input of said second monostable multivibrator; and which includes a photocell responsive to ambient lighting conditions and coupled to a control input of said gate for suppressing the operation of said second monostable multivibrator in response to the output signal produced by said Schmitt trigger circuit in the event of a sensed change in the ambient lighting conditions.

7. A touch control switch circuit responsive to a touch input applied to a receptor for controlling a load device coupled to the circuit, comprising:

a detector coupled to the receptor for producing short and long touch code signals in response to short and long touch inputs, respectively, applied to the receptor;

a decoder for distinguishing the short and long touch code signals and producing different output signals corresponding to the short and long touch code signals;

a memory circuit including a bistable device responsive to the output signals corresponding to the short touch code signals and a monostable device responsive to the output signals corresponding to the long touch code signals, said bistable device producing first control signals in response to alternate short touch code signals having a duration determined by the interval between successive short touch inputs, and said monostable device producing second control signals having a predetermined duration in response to long touch code signals; and a control circuit responsive to the first and second control signals produced by said memory circuit for operating the load device for an indefinite period in the event of a short touch input to the receptor, the operation of the load device terminating upon the occurrence of a subsequent short touch input, and for operating the load device for a predetermined period corresponding to the duration of the second control signals in the event of a long touch input to the receptor.

8. The circuit of claim 7, wherein:

said decoder comprises a shift register having an input responsive to the touch code signals produced by said detector and a plurality of sequentially operable outputs, clock means for operating said shift register at a predetermined rate, and a gate responsive to a combination of register outputs for producing an output signal in response to a long touch code signal; and said memory circuit comprises a flip-flop responsive to at least one of said register outputs, a monostable multivibrator having an input responsive to the output signal produced by said gate and an output coupled to the reset terminal of said flip-flop, and a control gate responsive to the outputs of said flip-flop and said monostable multivibrator for applying the control signals produced by said flip-flop and said monostable multivibrator to said control means.

9. The circuit of claim 8, which includes:

a low pass filter for coupling the output of said monostable multivibrator to said control gate.

10. A touch control switch circuit responsive to a touch input applied to a receptor for controlling a load device coupled to the circuit, comprising:

a detector coupled to the receptor for producing a touch code signal in response to a touch input applied to the receptor;

a decoder for producing a first output signal in response to a single touch code signal and for producing a second output signal in response to a combination of touch code signals in rapid succession;

a memory circuit including first and second bistable devices responsive to the first and second output signals, respectively, of said decoder, said first bistable device producing a first control signal in response to the first output signal of said decoder, and said second bistable device producing a second control signal in response to the second output signal of said decoder, said first bistable device being turned on by said second output signal; and a two-level control circuit having first and second inputs responsive to the first and second control signals, respectively, produced by said first and second bistable devices for operating the load device at a first level in the event of a single touch input to the receptor and operating the load device at a second level in the event of a combination of touch inputs to the receptor.

11. The circuit of claim 10, wherein:

said decoder comprises a monostable multivibrator having an input terminal responsive to the touch code signals produced by said detector and a decoder flip-flop having a set terminal responsive to the touch code signals produced by said detector, said flip-flop including a reset terminal coupled to the output of said monostable multivibrator and an output terminal coupled to a reset terminal of said monostable multivibrator; and said memory means comprises a first memory flip-flop having an input terminal responsive to the output of said monostable multivibrator and a set terminal responsive to the output of said decoder flip-flop, and a second memory flip-flop having an input terminal responsive to the output of said decoder flip-flop.

12. A multilevel touch control switch circuit responsive to a touch input applied to a receptor for selectively controlling a load device coupled to the circuit, comprising:

a detector coupled to the receptor for producing short and long touch code signals in response to short and long touch inputs, respectively, applied to the receptor;

a decoder for distinguishing the short and long touch code signals and producing different output signals corresponding to the short and long touch code signals;

a memory circuit including a bistable device responsive to the output signals corresponding to the short touch code signal for producing an on-off control signal and an analog circuit responsive to the on-off control signal produced by said bistable device and to the output of said decoder corresponding to the long touch code signal for producing an analog control signal having a magnitude determined by the duration of the long touch code signal; and a control circuit responsive to the on-off and analog control signals produced by said memory circuit for controlling the on and off operation of the load device and its level of operation.

13. The circuit of claim 12, wherein:

said decoder comprises a Schmitt trigger circuit responsive to the short and long touch code signals produced by said detector, an astable multivibrator responsive to the output of said Schmitt trigger circuit, and a gate having inputs responsive to the outputs of said Schmitt trigger circuit and said astable multivibrator; and said memory circuit includes a first flip-flop having an input terminal responsive to the output of said Schmitt trigger circuit and an output terminal coupled to an additional input of said gate, and a second flip-flop connected in series with said first flip-flop, said analog circuit comprising an up-down counter having a clock input coupled to the output of said gate and an up-down control terminal responsive to the output of said scond flip-flop, and a digital-to-analog converter for converting the output of said up-down counter into an analog control signal having a magnitude determined by the duration of the touch input to selectively control the level of operation of the load device.

14. The circuit of claim 13, wherein said decoder includes:

a low pass filter for coupling the output of said Schmitt trigger circuit to the input of said astable multivibrator.

15. A touch control switch circuit responsive to touch inputs applied to a receptor and to changes in ambient conditions for controlling the operation of a load device coupled to the circuit, comprising:

a detector circuit coupled to the receptor for producing short and long touch code signals in response to short and long touch inputs, respectively, applied to the receptor;

a decoder for distinguishing the short and long touch code signals and producing different output signals corresponding to the short and long touch code signals;

a memory circuit including a first bistable device responsive to the output signals corresponding to the short touch code signals for producing on-off control signals in the event of short touch inputs applied to the receptor and a second bistable device responsive to the output signals corresponding to the long touch code signals for producing an inhibit signal in the event of a long touch input applied to the receptor;

a sensing circuit responsive to changes in ambient conditions and to the inhibit signal produced by said second bistable device for producing an otuput signal to turn said first bistable device on in the event of a sensed change in ambient conditions and the absence of an inhibit signal;

a timing circuit responsive to the output signal of said sensing circuit for producing an output signal to turn off said first bistable circuit a predetermined time after the sensed change in ambient conditions; and a control circuit responsive to the output of said first bistable device for controlling the on-off operation of the load device.

16. The touch control circuit of claim 15, wherein said sensing circuit includes:

a photosensitive element responsive to changes in ambient lighting conditions.

17. The touch control circuit of claim 16, wherein said sensing circuit includes:

a gate responsive to the output of said photosensitive element and to the inhibit signal produced by said second bistable device for inhibiting the operation of said sensing circuit in response to sensed changes in the ambient lighting conditions in the event of a long touch input applied to the receptor.

18. The touch control circuit of claim 16, wherein said sensing circuit includes:

a control circuit responsive to abrupt changes in ambient lighting conditions sensed by said photosensitive element for preventing operation of said timing circuit.

19. The circuit of claim 15, which includes:

an indicator circuit responsive to the inhibit signal produced by said second bistable device for indicating whether said sensing circuit is active or inhibited.

20. The circuit of claim 15, wherein:

said decoder comprises a first shift register having an input responsive to the touch code signals produced by said detector and a plurality of sequentially operable outputs and clock means for operating said first shift register at a predetermined rate;

said sensing circuit comprises a second shift register having an input and a plurality of sequentially operable outputs, a sensor responsive to changes in ambient conditions and an input gate for coupling said sensor to the input of said second shift register; and said memory means comprising a first memory flip-flop having a clock input responsive to one of said outputs of said first shift register, a set terminal responsive to a combination of outputs of said second shift register, and a reset terminal, a timing circuit responsive to the same combination of outputs of said second shift register and coupled to the reset terminal of said first memory flip-flop for resetting said first memory flip-flop a predetermined time after the setting of said flip-flop, and a second memory flip-flop having a clock input responsive to a combination of outputs of said first shift register and an output coupled to said input gate to selectively permit said sensor to apply input signals to said second shift register.

21. The circuit of claim 20, wherein:

said sensor comprises a photosensitive device responsive to changes in ambient lighting conditions.

22. The circuit of claim 20, wherein:

said sensing circuit includes a control circuit responsive to abrupt transitions in ambient lighting conditions detected by said photosensitive device for preventing operation of said timing circuit.

23. The circuit of claim 22, wherein:

said control circuit includes a control gate responsive to the outputs of said second shift register, and a control flip-flop having a set terminal responsive to the output of said input gate, a reset terminal responsive to a selected output of said second shift register, and an output terminal coupled to an input of said control gate.

24. The circuit of claim 23, which includes:

a high pass filter for coupling the output of said input gate to the set terminal of said control flip-flop.

25. A touch control switch circuit responsive to a touch input applied to a receptor for controlling a load device coupled to the circuit, comprising:

a detector coupled to the receptor for producing a touch code signal in response to a coded touch input applied to the receptor;

a decoder for distinguishing different touch code signals produced by said detector and producing output signals corresponding to the different touch code signals;

a memory circuit responsive to the output signals for selectively recording the output signals and producing control signals of different characteristics determined by subsequent coded touch inputs and the recorded output signals;

control means responsive to the control signals produced by the memory circuit for selectively operating the load device in different functions determined by the control signals; and a sensing circuit responsive to changes in an ambient condition for suppressing the operation of siad memory circuit in response to predetermined output signals produced by said decoder in the event of a sensed change in the ambient condition to operate the load device independently of predetermined coded touch inputs.

26. A touch control switch circuit responsive to a touch input applied to a receptor for controlling a load device coupled to the circuit, comprising:

detecting means including an input for detecting a coded touch input applied to the receptor and a plurality of outputs for producing distinct output signals corresponding to different coded touch inputs;

a memory circuit including a plurality of memory elements responsive to the output signals produced by said detecting means for recording the output signals and producing control signals determined by the recorded output signals and subsequent coded touch inputs applied to the receptor; and control means responsive to the control signals produced by said memory circuit for selectively operating the load device upon the occurrence of the predetermined coded touch inputs.

* * * * *

UNITED STATES PATENT OFFICE
CERTIFICATE OF CORRECTION

Patent No. 3,805,096 Dated April 16, 1974

Inventor(s) William F. Hamilton, II

It is certified that error appears in the above-identified patent and that said Letters Patent are hereby corrected as shown below:

Claim 25, column 24, line 24, change "siad" to --said--.

Signed and sealed this 9th day of July 1974.

(SEAL)
Attest:

McCOY M. GIBSON, JR.
Attesting OFFICER

C. MARSHALL DANN
Commissioner of Patents